B. EMERSON & H. C. MORRIS.
GAS METER VALVE PROTECTOR.
APPLICATION FILED APR. 13, 1915.
1,228,656.
Patented June 5, 1917.
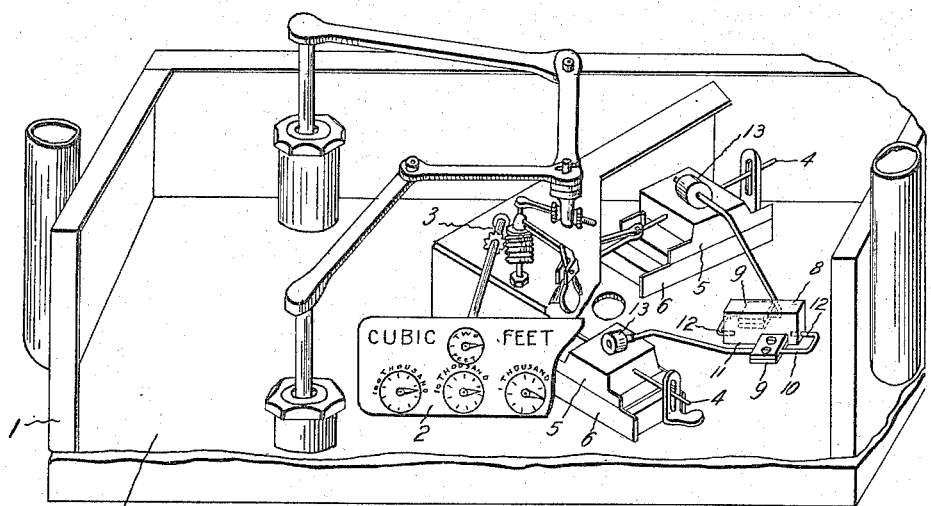
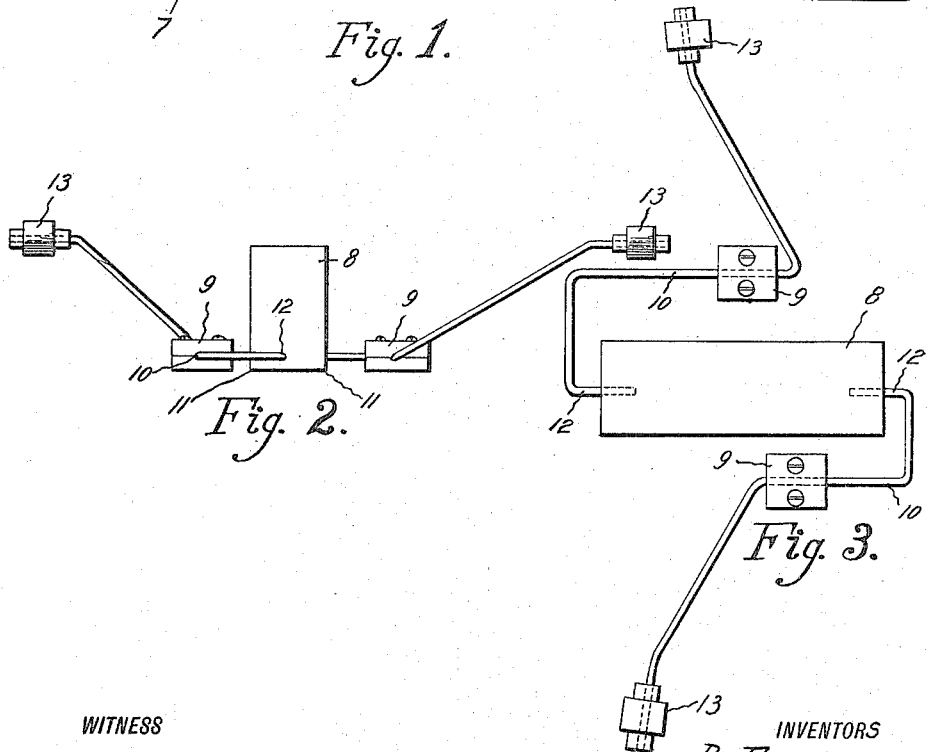
WITNESS
INVENTORS
B. Emerson,
H. C. Morris,
BY
John M. Spellman
ATTORNEY ically or surreptitiously tilted.
UNITED STATES PATENT OFFICE.

BENNETT EMERSON AND HENRY C. MORRIS, OF DALLAS, TEXAS; SAID EMERSON ASSIGNOR TO SAID MORRIS.

GAS-METER-VALVE PROTECTOR.

1,228,656.  Specification of Letters Patent.  Patented June 5, 1917.

Application filed April 13, 1915. Serial No. 21,000.

*To all whom it may concern:*

Be it known that we, BENNETT EMERSON and HENRY C. MORRIS, citizens of the United States, residing at Dallas, in the county of Dallas and State of Texas, have invented certain new and useful Improvements in Gas-Meter-Valve Protectors, of which the following is a specification.

Our invention has relation to an attachment for gas or fluid meters designed on the sliding valve principle wherein the valve is designed to open and close ports, which attachment permits in one use of our invention, gas to go in and out of diaphragms and diaphragm chambers, and which by means of various mechanisms operate the registering mechanism when the valve covers are properly seated on their seats and in such connection it relates more particularly to a device whereby the valve covers, which are normally seated by gravity, may be held to operative position upon their seats no matter to what angle the meter may be accidentally or surreptitiously tilted.

In meters of that type wherein the measurement of gas is accomplished by means of sliding valves and diaphragms, operating registering mechanism of the meter, the valve covers operate unrestrictedly upon their seats, being held to place by their weight or by gravity. It follows that so long as the meter remains in an upright position, the valve covers will remain properly seated and operate properly the mechanism for measuring flow of gas through the meter.

If, however, in this or similar types of meter, the meter be moved or dislodged from its normal upright position, the valve covers will be unseated and gas will pass through the meter without actuating the valves and without causing a registration of the flow of gas through the meter.

The principal objects of our invention are, first; to provide in conjunction with a sliding valve, an automatic mechanism whereby the cover or covers will remain properly seated when the meter is accidentally or purposely tilted from its normal upright position.

Second; to so arrange and construct this mechanism that when required a valve cover or covers may be installed, adjusted or removed for the purpose of cleaning or grinding the valves or seats without disturbing said mechanism or its auxiliary parts, and Third; to provide in such a device, a weight arranged to shift or tilt when the meter is shifted or tilted, said weight controlling in its movement an arm or arms arranged to automatically retain the valve cover or covers operatively with regard to their seat, or seats upon the shifting or tilting of the weight.

The nature and scope of our invention will be more fully understood from the following description taken in connection with the accompanying drawings forming part hereof, in which,—

Figure 1, is a perspective view of the device embodying our invention and of the auxiliary and adjacent parts of a gas meter to which the device is attached.

Fig. 2, is an elevational view of the device removed from the meter, and

Fig. 3, is a top or plan view of the device.

Referring to the drawings, 1 represents the meter and 2 the register. The mechanism 3 for operating the register 2 is of well known construction and is arranged to be indirectly controlled by the rods 4, 4 which are operated by the valve covers 5, 5 sliding on the valve seats 6, 6 of the meter; the rods 4, 4 are operatively connected to properly rotate the vertically disposed worm-wheels which are part of the registering mechanism 3. On the floor 7 of the meter is loosely supported a weight 8 and where two valve seats 6, 6, and two valve covers 5, 5, are employed in the meter as illustrated in the drawings, the weight 8 normally rests in an upright position on floor 7 some distance from each valve cover 5, and between two bearing blocks 9, 9. Each bearing block 9 is traversed by a crank arm 10 which extends through the block in a plane parallel with a lower side or bearing edge 11 of the weight 8. At one end the crank arm 10 is bent first at right angles, and then backward to form a U shaped extension 12 adapted to connect with the weight 8 at one end near its base and preferably midway between its lower bearing side edges 11. The other end of crank arm 10 is diagonally extended upward and then parallel with the base of said weight 8 and carries at its free end a friction roller 13 extending over the top of a sliding valve cover 5 and normally almost in contact therewith. When two crank arms 10 are used, they are connected with opposite ends of the weight 8 and are in fact oppositely arranged so that if weight 8 tilts to rest on either of its bearing edges both U shaped ends of crank arms 10 will be elevated to depress the rollers 13 upon the two valve covers 5, and this operation of both crank arms or a single crank arm will follow a tilting movement of weight 8 in a direction either toward or away from the face of the meter 1. When the rollers 13 rest upon the sliding valve covers 5, said covers are prevented from lifting or falling away from their seats and hence the rods 4, 4 will always be actuated to operate the registering device, no matter at what angle the meter may be supported.

Having thus described the nature and objects of our invention what we claim as new and desire to secure by Letters Patent, is,—

1. In a device of the character described, the combination with registering mechanism of a meter, of a sliding valve cover indirectly controlling said mechanism, and means, maintained in inoperative condition when the meter is in its normal upright position, for holding said cover in operative position when the meter is moved from its normal position.

2. In a device of the character described, the combination with registering mechanism of a meter, of a plurality of sliding valve covers indirectly controlling said mechanism, and means, maintained in inoperative condition when the meter is in its normal upright position, for holding said covers in operative position when the meter is moved from its normal position.

3. In a device of the character described, the combination with the cover of a sliding valve of a meter, of mechanism indirectly controlled by said cover for registering the flow of fluid through the meter, means for positively seating said cover on said valve, and a weight loosely supported within the meter, and controlling said cover seating means.

4. In a device of the character described, the combination with the cover of a slide valve of a meter, of mechanism indirectly controlled by said cover for registering the flow of fluid through the meter, a roller arranged adjacent to the upper face of said cover, a crank arm supporting said roller, and a weight tiltably mounted in the meter, to support said crank arm, said parts being arranged so that the weight operates the crank arm to force the roller against the valve cover when the meter is tilted.

5. In a device of the character described, the combination with a registering mechanism, of two valve covers the movement of which indirectly controls said mechanism, a weight tiltably mounted adjacent to each cover, a crank arm projecting from each weight, a bearing for each crank arm, and a roller carried by each crank arm and extending over and adjacent to each cover.

In testimony whereof we have signed our names to this specification.

BENNETT EMERSON.
HENRY C. MORRIS.

Copies of this patent may be obtained for five cents each, by addressing the "Commissioner of Patents, Washington, D. C."